No. 794,856.
PATENTED JULY 18, 1905.
E. FIRNHABER.
ANIMAL TRAP.
APPLICATION FILED FEB. 20, 1905.
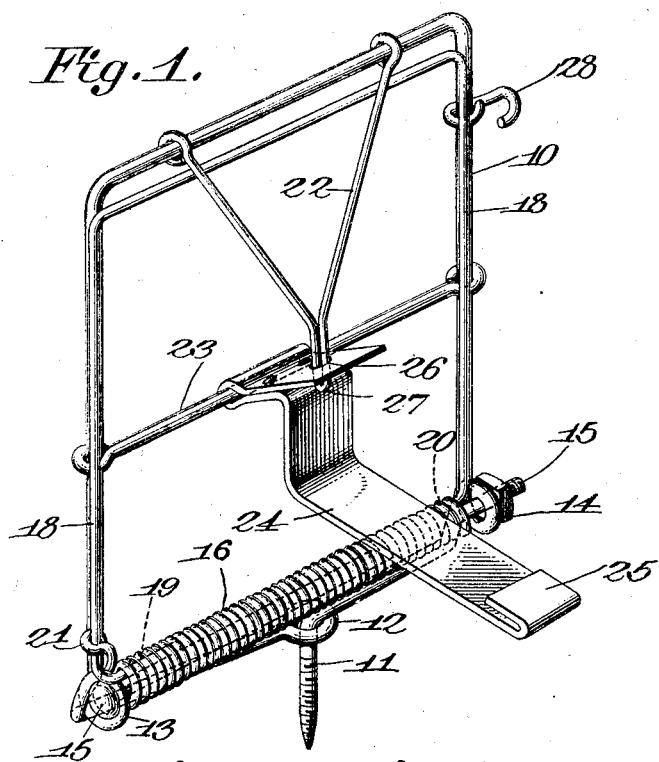
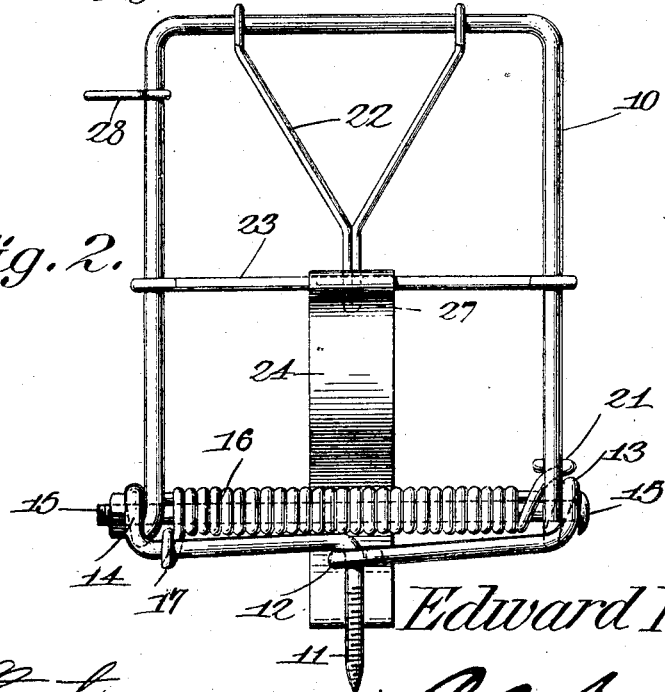
Witnesses
E. F. Stewart
C. N. Woodward
Edward Firnhaber,
Inventor
by C. A. Snow & Co
Attorneys No. 794,856.

Patented July 18, 1905.

UNITED STATES PATENT OFFICE.

EDWARD FIRNHABER, OF JANESVILLE, MINNESOTA.

ANIMAL-TRAP.

SPECIFICATION forming part of Letters Patent No. 794,856, dated July 18, 1905.

Application filed February 20, 1905. Serial No. 246,563.

*To all whom it may concern:*

Be it known that I, EDWARD FIRNHABER, a citizen of the United States, residing at Janesville, in the county of Waseca and State of Minnesota, have invented a new and useful Animal-Trap, of which the following is a specification.

This invention relates to animal-traps, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the improved trap in poised or "set" position viewed from the front. Fig. 2 is a rear elevation.

The improved device comprises a rectangular frame 10 of a single piece of wire with one end extended into a threaded supporting-spur 11 and the other end looped around the threaded end, as at 12. The frame 10 is also provided with eyes 13 14, coiled in the side members, and in alinement transversely of the frame the eyes for supporting a shaft 15. Coiled about the shaft 15, between the eyes 13 14, is a spring 16, having one end connected to the frame 10, as at 17.

The striker member 18 is in rectangular form approximately of the same shape as the frame 10 and with the ends at 19 20 turned inwardly and inserted into the ends of the spring 16 alongside the shaft, the spring thus serving as a bearing upon which the striker member swings. The opposite end of the spring 16 is connected to the striker member, as at 21, so that the force of the spring is thereby utilized to maintain the striker member yieldably in depressed position, as will be obvious.

A trigger member 22 is mounted to swing from the free end of the frame 10 and support the striker member in elevated position when the trigger member is in depressed position, as in Fig. 1. Connecting the side members of the frame 10 and intermediately of the same is a rod 23, and swinging upon the rod is a trip member 24, having a bait-support 25 at its free end and with an aperture 26 near the rod 23 to receive the free end 27 of the trigger 22, as in Fig. 1. By this simple arrangement the striker member will be maintained in a poised position until a slight downward movement of the trip 24 is made in the effort of the animal to remove the bait therefrom, when the striker member will be released and be thrown violently downward upon the animal, either killing it instantly and retaining the body beneath the striker or imprisoning the animal if not killed outright.

The trap may be attached to a supporting-block or to the floor or other support by the spur 11 in any desired locality and may be of any desired size to catch any size of animal.

A safety-hook 28 is connected to swing from the frame 10 for engaging the striker member and retaining it in poised position when not in use or when being shipped, and thus enabling the trap to be packed in a small space. This is an important feature of the invention and adds materially to its value.

Having thus described the invention, what is claimed is—

An animal-trap comprising a rectangular frame formed from a single piece of wire with one end extended and threaded to form a spur for supporting the frame in vertical position and provided with transversely-alined eyes bent into its side members, a shaft supported in said eyes, a spring coiled upon said shaft and connected by one end to said frame, a striker member swinging from said spring and connected to the other end of the same whereby the force of the spring is exerted to maintain said striker member in depressed position, a trigger connected to said frame for engagement with said striker member for holding the same in poised position, and a trip having a bait-support at one end and detachably connected to said trigger at the other end.

In testimony that I claim the foregoing as my own I have hereto affixed my signature in the presence of two witnesses.

EDWARD FIRNHABER.

Witnesses:
W. A. BORN,
EMIL DIEUDONNE.